United States Patent
Takahashi et al.

(10) Patent No.: US 7,442,363 B2
(45) Date of Patent: Oct. 28, 2008

(54) HYDROGEN IODIDE MANUFACTURING METHOD AND HYDROGEN IODIDE MANUFACTURING APPARATUS

(75) Inventors: Ryouta Takahashi, Tokyo (JP); Hideki Nakamura, Kanagawa (JP); Kazuo Murakami, Kanagawa (JP); Haruhiko Takase, Kanagawa (JP); Noboru Jimbo, Kanagawa (JP); Kazuya Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 20 days.

(21) Appl. No.: 11/458,537

(22) Filed: Jul. 19, 2006

(65) Prior Publication Data
US 2007/0020169 A1 Jan. 25, 2007

(30) Foreign Application Priority Data
Jul. 22, 2005 (JP) ............................. 2005-213111

(51) Int. Cl.
C01B 7/13 (2006.01)
C01B 17/74 (2006.01)
C01B 3/02 (2006.01)
C01B 3/04 (2006.01)

(52) U.S. Cl. .................... 423/648.1; 423/481; 423/486; 423/522; 423/658.2; 423/652

(58) Field of Classification Search ................. 423/481, 423/486, 652, 648.1, 522, 658.2
See application file for complete search history.

(56) References Cited

U.S. PATENT DOCUMENTS

| 4,089,939 A | | 5/1978 | Norman et al. |
|---|---|---|---|
| 4,107,015 A | * | 8/1978 | Chlanda et al. ............. 204/538 |
| 4,115,148 A | * | 9/1978 | Okubo et al. ................. 134/21 |
| 4,127,644 A | | 11/1978 | Norman et al. |
| 4,330,374 A | | 5/1982 | O'Keefe et al. |
| 4,396,591 A | * | 8/1983 | Norman ....................... 423/462 |
| 5,321,946 A | * | 6/1994 | Abdelmalek ................. 60/648 |

OTHER PUBLICATIONS

Barbor, J. A. "Basic College Chemistry", Second edition, 1953, pp. 255-260.*

* cited by examiner

Primary Examiner—Ngoc-Yen M Nguyen
(74) Attorney, Agent, or Firm—Oblon, Spivak, McClelland, Maier & Neustadt, P.C.

(57) ABSTRACT

A hydrogen iodide manufacturing method which includes a step of producing aqueous solution of hydrogen iodide and sulfuric acid by causing iodine-containing aqueous solution and sulfur dioxide to react with each other in a pressurized condition. The pressurized condition may be of not lower than 0.1 MPa in gauge pressure. The method may further include: a separation step of adding iodine to the aqueous solution of hydrogen iodide and separating an upper phase containing sulfuric acid relatively to a large extent and a lower phase containing hydrogen iodide relatively to a large extent; and a step of producing hydrogen iodide by adding sulfur dioxide to the upper phase in a pressurized condition and extracting the produced hydrogen iodide to the lower phase.

21 Claims, 6 Drawing Sheets

HYDROGEN IODIDE MANUFACTURING METHOD AND HYDROGEN IODIDE MANUFACTURING APPARATUS

CROSS REFERENCES TO RELATED APPLICATIONS

The present invention contains subject matter related to Japanese Patent Application No. 2005-213111, filed in the Japanese Patent Office on Jul. 22, 2005, the entire content of which is incorporated herein by reference.

BACKGROUND OF THE INVENTION

This invention relates to a hydrogen iodide manufacturing method to be used for manufacturing hydrogen by way of a thermochemical decomposition process (IS method: iodine-sulfur method) and an apparatus to be used for such a method.

In recent years, the use of hydrogen is attracting attention as fuel that can suppress the emission of carbon dioxide ($CO_2$) that is a greenhouse gas. The IS method is known as a technique of manufacturing hydrogen (See, for example, Japanese Patent Publication Nos. 60-52081, 60-48442 and 4-37002, and U.S. Pat. No. 4,127,644).

The principal reactions of the IS method include three reactions expressed by reaction formulas (1) through (3) shown below. Firstly, water, iodine and sulfur dioxide are made to react with each other at 70 to 100 degrees Celsius to produce hydrogen iodide to be used as raw material for forming hydrogen. Although sulfuric acid is also produced at this time, hydrogen iodide and sulfuric acid can be separated from each other by extracting the produced hydrogen iodide, using iodine by an amount of two to three times of the mass of the hydrogen iodide. In the second step, the obtained hydrogen iodide is thermally decomposed at 400 degrees Celsius to obtain hydrogen. In the third step, sulfuric acid is thermally decomposed at a high temperature of 900 degrees Celsius to recover the sulfur dioxide. Since iodine is obtained by thermally decomposing hydrogen iodide, it is reused with sulfur dioxide. The IS method is also referred to as thermochemical decomposition method, because water is decomposed into hydrogen and oxygen by means of sulfur dioxide, iodine and thermal energy by this method.

$$I_2 + SO_2 + 2H_2O \rightarrow 2HI + H_2SO_4 \quad (1)$$

$$2HI \rightarrow H_2 + I_2 \quad (2)$$

$$2H_2SO_4 \rightarrow 2SO_2 + 2H_2O + O_2 \quad (3)$$

The hydrogen iodide forming reaction of the reaction formula (1) is also referred to as Bunsen reaction. The efficiency of forming hydrogen iodide in the Bunsen reaction influences the downstream reactions and dominates the efficiency of hydrogen formation. The hydrogen iodide produced from the Bunsen reaction is extracted by excessively applying iodine, and is subsequently condensed by electrodialysis or distillation to form aqueous solution of hydrogen iodide that is concentrated beyond the azeotropic composition thereof. Hydrogen iodide gas can be obtained with ease by distillation from aqueous solution of hydrogen iodide whose concentration exceeds the azeotropic composition.

Hydrogen iodide gas is decomposed into hydrogen and iodine according to the reaction formula (2). The decomposing reaction of hydrogen iodide (Bodenstein reaction) is a uniform gas phase reaction. In the hydrogen iodide decomposing reaction, hydrogen iodide is dissociated to produce hydrogen and iodine at or near 400 degrees Celsius, so that hydrogen iodide, hydrogen and iodine coexist as mixed equilibrium gas at that temperature. The pressure equilibrium constant of the gas has been determined to be about 50 and the dissociation ratio is 22%. Therefore, it is important for the hydrogen manufacturing process to raise the hydrogen iodide forming ratio and obtain aqueous solution of hydrogen iodide beyond the azeotropic composition in the hydrogen iodide forming reaction.

While sulfurous acid and iodine quantitatively react with each other instantaneously, sulfur dioxide and iodine react with each other only by several percent stoichiometrically. The reason for this is that water is required for the reaction of sulfur dioxide and iodine, and that sulfur dioxide reacts with iodine only when it is dissolved in water to change itself into sulfurous acid. The equilibrium constant of the reaction of dissolving sulfur dioxide in water is 0.054. In view of this numerical value, the data is reasonable that the reaction of dissolving sulfur dioxide in water proceeds only by 8% at 55 degrees Celsius and only by 4% at 80 degrees Celsius relative to the reaction of sulfurous acid and iodine.

Additionally, while sulfur dioxide is a linear molecule and does not have any dipole moment, the sulfur atom in sulfurous acid is electrically positively charged. Therefore, the sulfur atom can easily interact with hydrogen iodide when sulfur dioxide is dissolved into water and turned to sulfurous acid. The reaction of sulfur dioxide, iodine and water proceeds faster at 55 degrees Celsius than at 80 degrees Celsius, because sulfur dioxide is dissolved less into water when the temperature is high, and because the reaction efficiency falls at 80 degrees Celsius due to iodine sublimation at that temperature.

When iodide ions exist in an aqueous solution system, iodine and iodide ions form a sort of complex to become more dissolved in water. As the iodine ion concentration rises, the iodine molecule grows to become $I_9^-$ at largest.

$$I_2 + I^- \rightarrow I_3^- \quad (5)$$

$$2I_2 + I^- \rightarrow I_5^- \quad (6)$$

$$3I_2 + I^- \rightarrow I_7^- \quad (7)$$

$$4I_2 + I^- \rightarrow I_9^- \quad (8)$$

Hydrogen iodide and sulfuric acid in the solution produced as a result of the Bunsen reaction are separated into two phases because of the difference of density as a result of addition of iodine. Iodide ions and iodine show affinity for each other, and it is known that associations as expressed by formulas (5) through (8) below take place when they coexist. The formation constants of the formulas are known. The formation constants for forming iodide ions/iodine complexes in aqueous solution of sodium iodide are listed below. Note, however, that $\beta_3$ and $\beta_4$ are estimated from the difference between $\beta_1$ and $\beta_2$ because no data is available about their values.

$$\log(\beta_1/mol^{-1}dm^3) = \log([I_3^-]/[I^-][I_2]/mol^{-1}dm^3) = 2.86 \quad (9\text{-}1)$$

$$\log(\beta_2/mol^{-2}dm^6) = \log([I_5^-]/[I^-][I_2]^2/mol^{-2}dm^6) = 5.27 \quad (10\text{-}1)$$

$$\log(\beta_3/mol^{-3}dm^9) = \log([I_7^-]/[I^-][I_2]^3/mol^{-3}dm^9) = 7.23 \quad (11\text{-}1)$$

$$\log(\beta_4/mol^{-4}dm^{12}) = \log([I_9^-]/[I^-][I_2]^4/mol^{-4}dm^{12}) = 8.75 \quad (12\text{-}1)$$

The total iodide ion concentration $C_{I^-}$ can be expressed by formula (13) below, and formulas (14) through (18) are obtained from $C_{I^-}$ and the total equilibrium constants.

$$C_{I^-} = [I^-] + [I_3^-] + [I_5^-] + [I_7^-] + [I_9^-] \quad (13)$$

Thus, formula (9-2) below is obtained from the formula (9-1).

$$[I_3^-] = [I^-][I_2]\beta_1 \quad (9\text{-}2)$$

Formula (10-2) below is obtained from the formula (10-1).

$$[I_5^-] = [I^-][I_2]^2\beta_2 \quad (10\text{-}2)$$

Formula (11-2) below is obtained from the formula (11-1).

$$[I_7^-] = [I^-][I_2]^3\beta_3 \quad (11\text{-}2)$$

Formula (12-2) below is obtained from the formula (12-1).

$$[I_9^-] = [I^-][I_2]^4\beta_4 \quad (12\text{-}2)$$

Thus, $$\alpha_0 = [I^-]/C_{I^-} = 1/(1 + [I_2]\beta_1 + [I_2]^2\beta_2 + [I_2]^3\beta_3 + [I_2]^4\beta_4) \quad (14)$$

$$\alpha_1 = [I_3^-]/C_{I^-} = [I_2]\beta_1/(1 + [I_2]\beta_1 + [I_2]^2\beta_2 + [I_2]^3\beta_3 + [I_2]^4\beta_4) \quad (15)$$

$$\alpha_2 = [I_5^-]/C_{I^-} = [I_2]^2\beta_2/(1 + [I_2]\beta_1 + [I_2]^2\beta_2 + [I_2]^3\beta_3 + [I_2]^4\beta_4) \quad (16)$$

$$\alpha_3 = [I_7^-]/C_{I^-} = [I_2]^3\beta_3/(1 + [I_2]\beta_1 + [I_2]^2\beta_2 + [I_2]^3\beta_3 + [I_2]^4\beta_4) \quad (17)$$

$$\alpha_4 = [I_9^-]/C_{I^-} = [I_2]^4\beta_4/(1 + [I_2]\beta_1 + [I_2]^2\beta_2 + [I_2]^3\beta_3 + [I_2]^4\beta_4) \quad (18)$$

Thus, $\alpha_0$ through $\alpha a_4$ show the distribution of formation of the respective iodide ions/iodine complexes. From the distribution of formation curves, it is understood that iodide ions and iodine can readily interact and form complexes. Where free [$I_2$] shows a large proportion, iodide ions are bonded to iodine to form complexes of higher orders. Therefore, hydrogen iodide is stably bonded to iodine in the lower phase of HI/$I_2$ that is produced as a result of a two-phase separation process. The yield of iodide ions rises under the condition of little water, probably because the iodine concentration relatively rises to form complexes of higher orders, which then move to the lower phase.

To obtain gaseous hydrogen iodide by means of the prior art, hydrogen iodide and sulfuric acid are subjected to a two-phase separation process that uses iodine after the completion of a Bunsen reaction, and subsequently the lower phase liquid is moved to a hydrogen iodide refining process so as to remove the sulfuric acid contained in the lower phase liquid by causing a Bunsen reaction to take place in the opposite direction. In this stage of operation, the weight percent concentration of hydrogen iodide (=(mass of hydrogen iodide contained in lower phase liquid)/(sum of mass of hydrogen iodide and water contained in lower phase liquid)) cannot exceed the azeotropic composition of hydrogen iodide. Then, it is not possible to directly take out hydrogen iodide anhydride gas with ease. Therefore, the liquid product that contains hydrogen iodide is condensed by electrodialysis until it comes to exceed the azeotropic composition. The azeotropic composition of hydrogen iodide is 57%.

Hydrogen iodide can be isolated with ease from aqueous solution of hydrogen iodide that is condensed beyond the azeotropic composition by means of electrodialysis. Therefore, it is possible to take out pure hydrogen iodide gas by distillation in the next step. If the hydrogen iodide concentration in the lower phase liquid can be made to exceed the azeotropic composition as a result of a two-phase separation process that is conducted after the completion of a Bunsen reaction, the concentration step of electrodialysis is not necessary.

Sulfur dioxide dissolves by only 0.8 moles in 1 liter of water under the conditions of room temperature and atmospheric pressure, and free sulfur dioxide reacts with water and become decomposed to produce sulfur. One of the factors that lower the hydrogen iodide forming efficiency is clogging of pipes due to deposited sulfur. The efficiency of hydrogen iodide formation rises when sulfur dioxide is forcibly mixed with water that operates as solvent to increase the contact time with iodine and the rise of the efficiency of hydrogen iodide formation is reflected to the efficiency of forming hydrogen. However, once the solubility of sulfur dioxide in water is exceeded, sulfur dioxide is no longer dissolved in water and free sulfur dioxide reacts with water and becomes decomposed to produce sulfur, which by turn clogs the pipes of the mixer. Additionally, since the reaction of forming hydrogen iodide is conducted at or near 100 degrees Celsius, loss of iodide due to sublimation and clogging of pipes are problems that need to be solved in the industry.

Since hydrogen iodide can be obtained with ease by causing iodine to react with aqueous solution of sulfurous acid and an oxidation/reduction reaction to take place, the object of the present invention is to raise the conversion ratio of sulfur dioxide into hydrogen iodide or sulfuric acid, and thereby to obtain highly concentrated aqueous solution of hydrogen iodide by improving the solubility of sulfur dioxide relative to water in a hydrogen iodide forming reaction.

BRIEF SUMMARY OF THE INVENTION

In order to attain the object, according to an aspect of the present invention, there is provided a hydrogen iodide manufacturing method comprising a step of producing aqueous solution of hydrogen iodide and sulfuric acid by causing iodine-containing aqueous solution and sulfur dioxide to react with each other in a pressurized condition.

According to another aspect of the present invention, there is provided a hydrogen iodide manufacturing method comprising a step of producing sulfuric acid and aqueous solution of hydrogen iodide by: forming a first aqueous solution containing sulfur dioxide or sulfurous acid by adding sulfur dioxide to water in a pressurized condition; and mixing a second aqueous solution containing iodine and the first aqueous solution in a pressurized condition.

According to yet another aspect of the present invention, there is provided a hydrogen iodide manufacturing apparatus for producing hydrogen iodide and sulfuric acid by causing iodine, sulfur dioxide and water to react with each other, the apparatus comprising: a sulfur dioxide dissolving tank that is a pressure-resistant container for producing aqueous solution of sulfur dioxide by mixing sulfur dioxide and water; a sulfur dioxide source for supplying pressurized sulfur dioxide into the sulfur dioxide dissolving tank; a reaction tank that is a pressure-resistant container for causing the reaction to take place in a pressurized condition; a pipe for supplying the aqueous solution of sulfur dioxide produced in the sulfur dioxide dissolving tank into the reaction tank; iodine-containing aqueous source for supplying iodine-containing aqueous solution into the reaction tank; and at least one back pressure valve for discharging gas therethrough from the sulfur dioxide dissolving tank and the reaction tank, so as to maintain pressure in the sulfur dioxide dissolving tank and the reaction tank above a predetermined level above the atmospheric pressure.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Now, the present invention will be described in greater detail by referring to the accompanying drawings that illustrate preferred embodiments of the present invention.

First Embodiment

Figure 1:
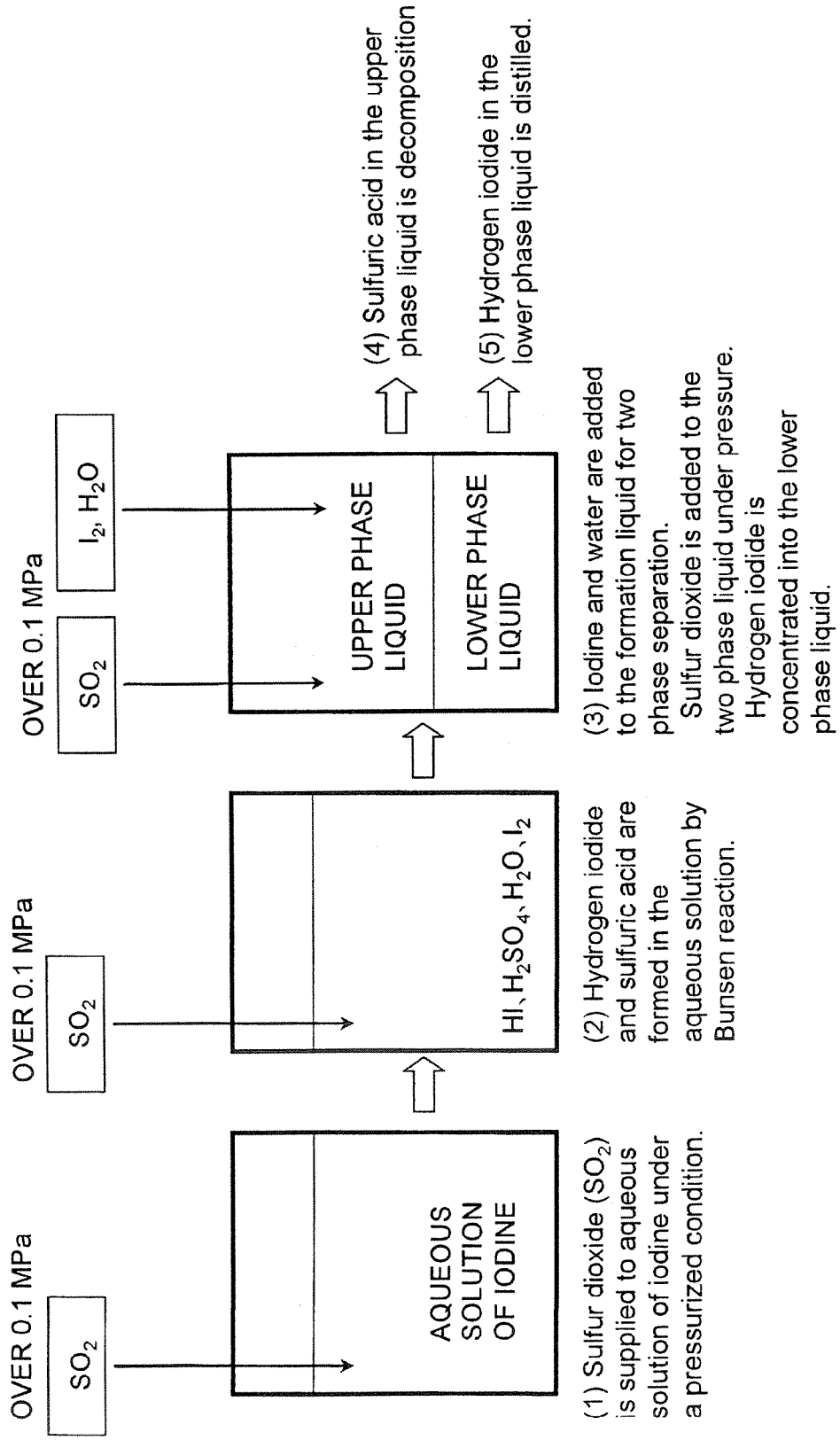
FIG. 1 is a flowchart of the first embodiment of hydrogen iodide manufacturing method according to the present invention.

FIG. 1 is a flowchart of the first embodiment of hydrogen iodide manufacturing method according to the present invention. The flow of the embodiment of hydrogen iodide manufacturing method proceeds in a manner as described below.

(1) Sulfur dioxide ($SO_2$) is supplied to aqueous solution of iodine under a pressurized condition.

(2) Iodine, water and sulfur dioxide react with each other under a pressurized condition (Bunsen reaction).

(3) Iodine and water are added to the formation liquid under a pressurized condition for two-phase separation to produce an upper phase and a lower phase, and the Bunsen reaction is caused to take place by further adding sulfur dioxide to take hydrogen iodide into the lower phase and to concentrate the hydrogen iodide beyond the azeotropic composition.

(4) After the concentration step of (3) described above, the sulfuric acid in the upper phase liquid is moved to a sulfuric acid decomposition step.

(5) After the concentration step of (3) described above, the hydrogen iodide in the lower phase liquid is moved to a hydrogen iodide distillation step.

As sulfur dioxide is pressurized and added to aqueous solution of iodine, sulfur dioxide is dissolved in water beyond the solubility of sulfur dioxide to water under the atmospheric pressure, and is caused to quantitatively react with iodine instantaneously to form hydrogen iodide and sulfuric acid. Iodine is added to the formation liquid excessively by more than the mass of the produced hydrogen iodide for two-phase separation. Then, water and sulfur dioxide are added under a pressurized condition to move the sulfuric acid and the hydrogen iodide formed by the Bunsen reaction, respectively into the upper phase and the lower phase for concentration.

Figure 2:
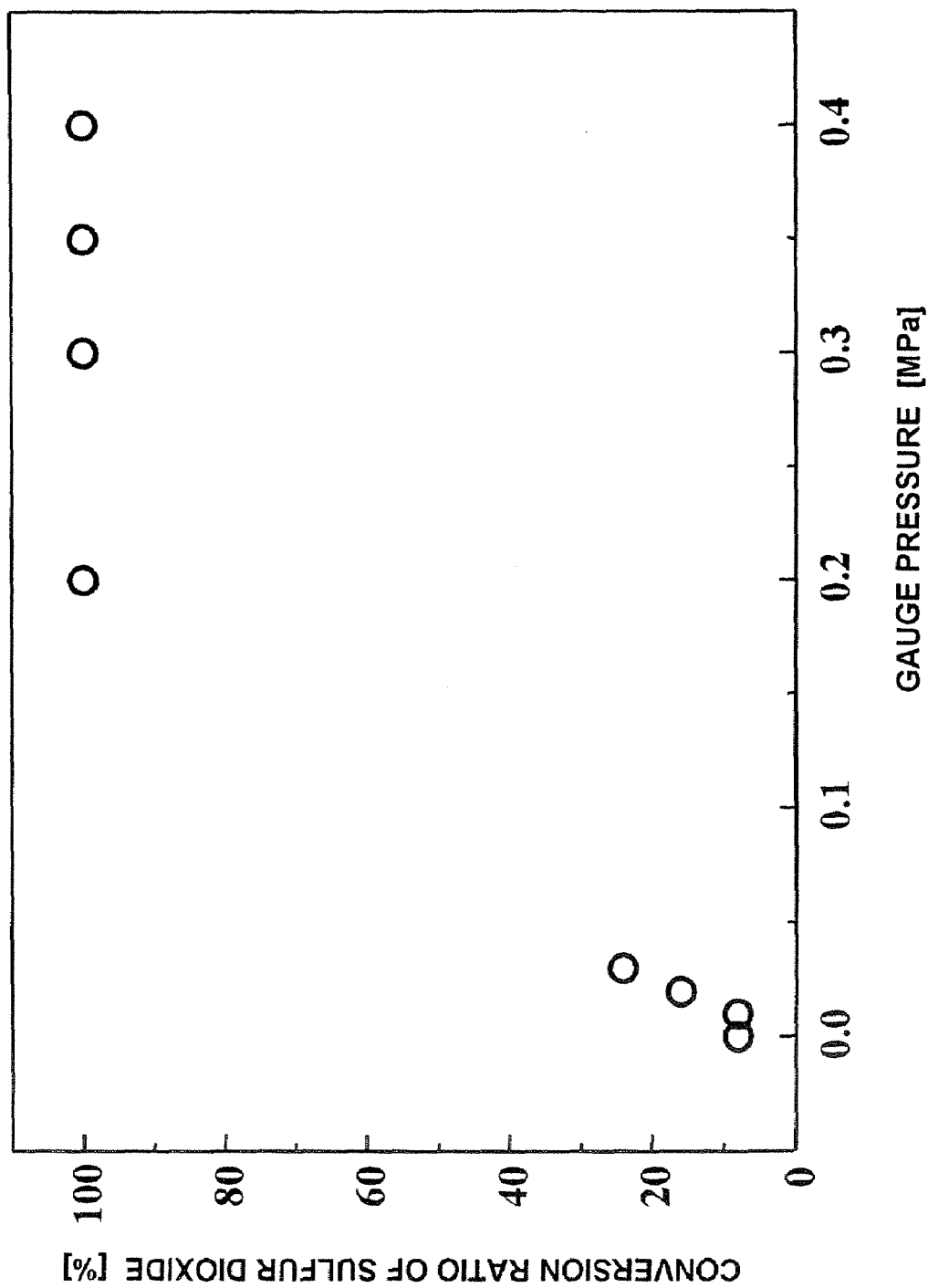
FIG. 2 is a graph illustrating the pressure dependency of the $SO_2$ conversion ratio in the Bunsen reaction.

FIG. 2 is a graph obtained by plotting the conversion ratio of the sulfur dioxide for forming hydrogen iodide and sulfuric acid by way of a reaction with iodine when the sulfur dioxide gas has passed through the aqueous solution of iodine, against gauge pressure. The conversion ratio of sulfur dioxide is determined a half of the mass of the hydrogen iodide or the mass of the sulfuric acid formed according to the reaction formula (1) divided by the mass of the added sulfur dioxide. The conversion ratio shows the ratio of the sulfur dioxide that has reacted.

The solubility of sulfur dioxide under the atmospheric pressure is 5 to 10% in terms of weight percentage concentration and the conversion ratio is about 8%, when the gauge pressure is 0 MPa (or atmospheric pressure). This result substantially matches the solubility of sulfur dioxide under the atmospheric pressure. The conversion ratio of sulfur dioxide increases in proportion to the gauge pressure up to 0.2 MPa and all the added sulfur dioxide reacts and the conversion ratio gets to 100% above 0.2 MPa. Thus, it will be understood that the conversion ratio rises remarkably when the pressure is raised.

Figure 6:
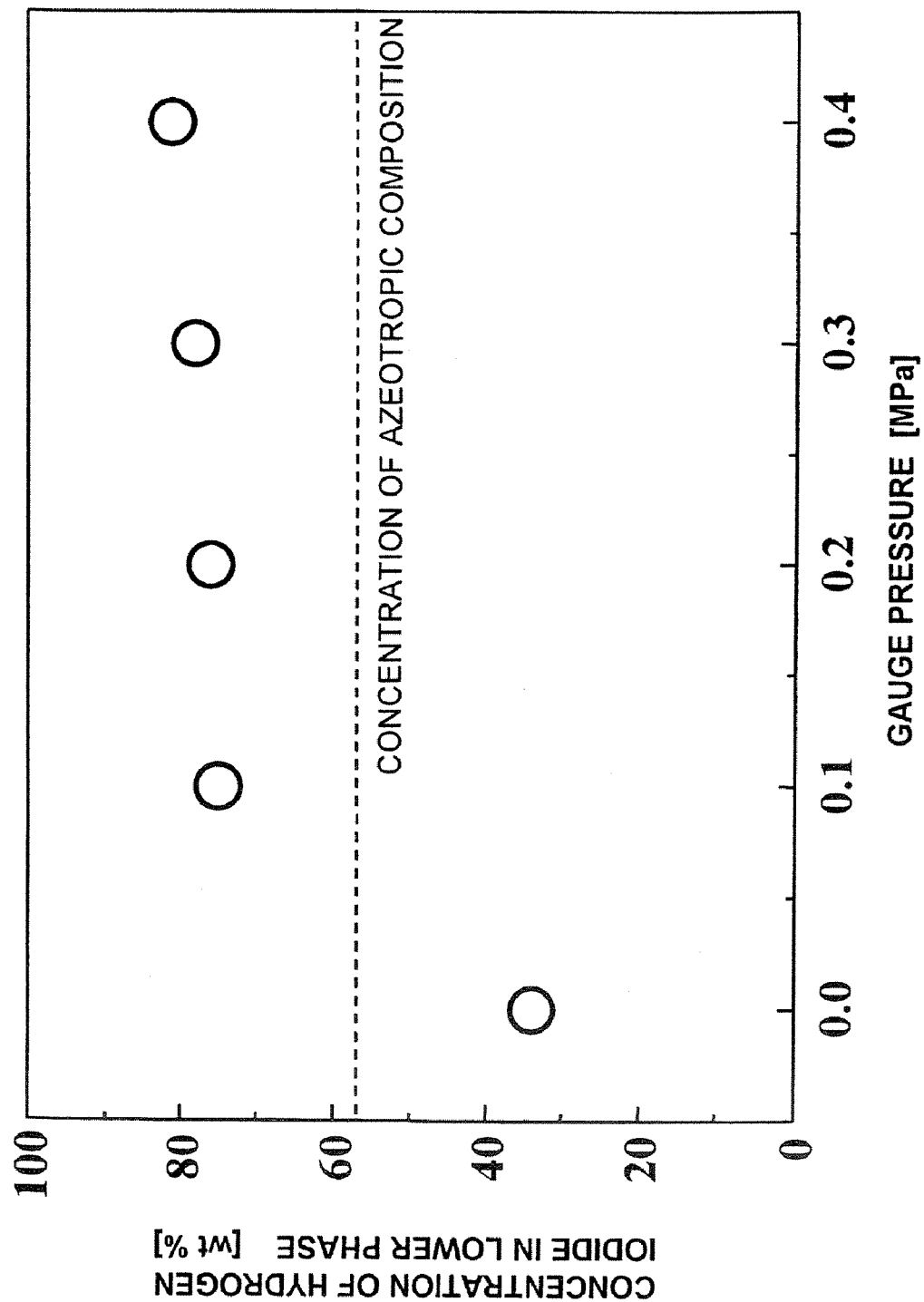
FIG. 6 is a graph illustrating the pressure dependency of the concentration of hydrogen iodide in the lower phase liquid formed by the pressurized Bunsen reaction.

FIG. 6 is a graph illustrating the measured pressure dependency of the concentration of hydrogen iodide in the lower phase liquid formed by the pressurized Bunsen reaction. When the gauge pressure was 0 MPa (or at the atmospheric pressure), the concentration of hydrogen iodide in the lower phase liquid was 34% and did not exceed 57% that is the concentration of the azeotropic composition thereof. However, under pressurized condition of 0.1 MPa or higher pressure, the concentration of hydrogen iodide in the lower phase liquid exceeded 57% or the concentration of the azeotropic composition. If the concentration of hydrogen iodide in the lower phase liquid exceeded the concentration of the azeotropic composition, it is easy to separate hydrogen iodide from the lower phase liquid in the downstream distillation process. Thus it is understood that efficiency of concentration of hydrogen iodide in the lower phase liquid is enhanced by pressurization.

Sulfur dioxide dissolves in water under pressure and becomes hydrated, so that an oxidation/reduction reaction takes place instantaneously between the sulfur dioxide and the dissolved iodine to produce hydrogen iodide and sulfuric acid. While the ratio of the oxidation/reduction reaction between hydrated sulfur dioxide and iodine is about 8% under the atmospheric pressure, it can be raised to 100% by adding sulfur dioxide to aqueous solution of iodine under pressure.

Second Embodiment

Figure 3:
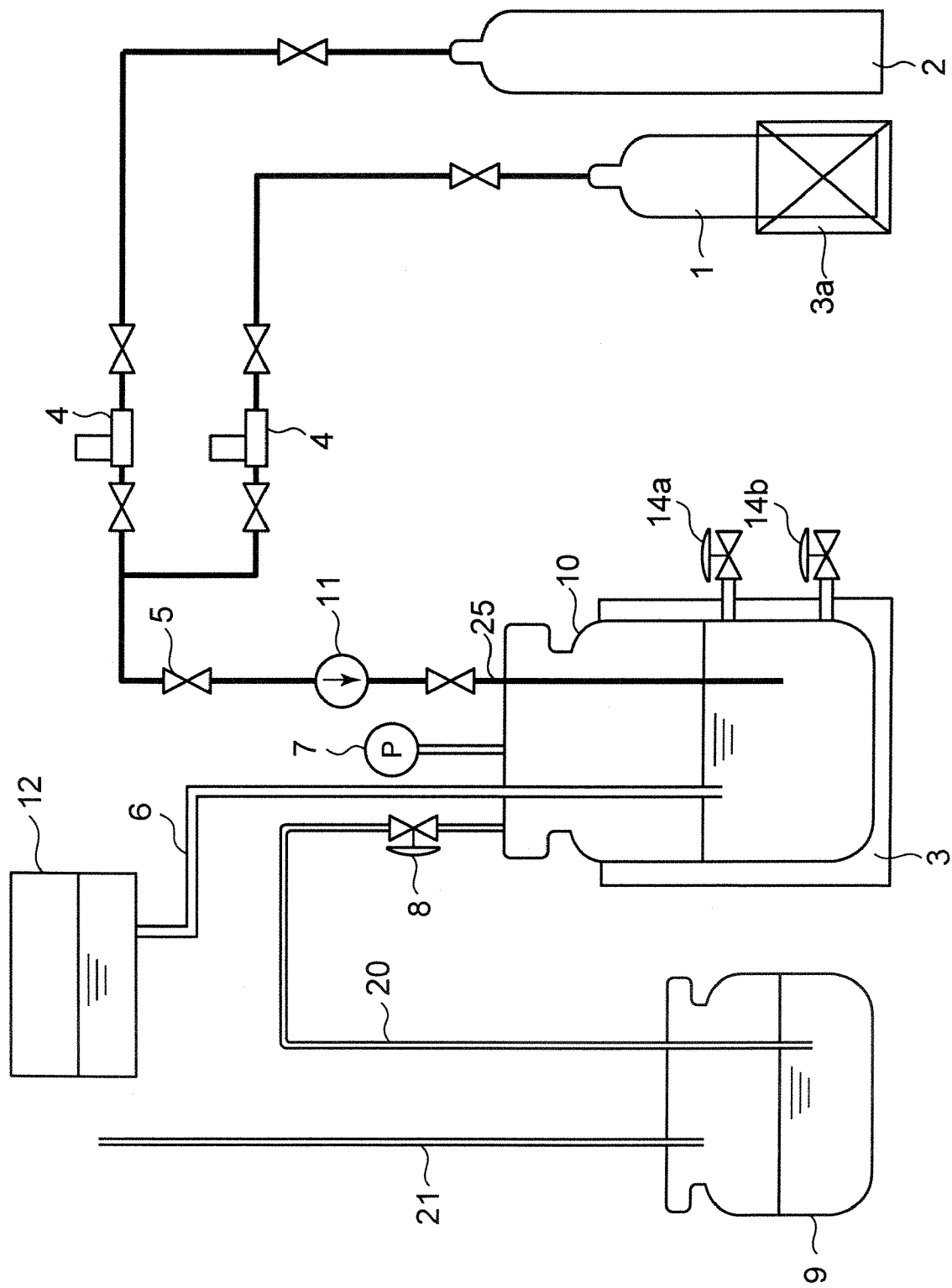
FIG. 3 is a schematic diagram of a hydrogen iodide manufacturing apparatus that can be used for the second embodiment of hydrogen iodide manufacturing method according to the present invention.

FIG. 3 is a schematic diagram of a hydrogen iodide manufacturing apparatus that can be used for the second embodiment of hydrogen iodide manufacturing method according to the present invention.

Referring to FIG. 3, a reaction tank 10 is a pressure-resistant container that is provided with a pressure gauge 7 for detecting the internal gauge pressure of the reaction tank 10. A heater 3 is provided to heat the inside of the reaction tank 10. The reaction tank 10 is equipped with an upper discharge pipe 14a and a lower discharge pipe 14b. A supply tank 12 is arranged above the reaction tank 10 to supply iodine and water into the reaction tank 10 by way of a pipe 6.

A sulfur dioxide gas cylinder 1 and a nitrogen gas cylinder 2 are arranged at the outside of the reaction tank 10 to respectively feed sulfur dioxide and nitrogen to the reaction tank 10 by way of respective mass flow meters 4, a valve 5, a pressurizing pump 11 and a sulfur dioxide feed pipe 25. The sulfur dioxide feed pipe 25 enters the reaction tank 10 from the top of the reaction tank 10 and its lower end is extended to a lower part of the reaction tank 10. The sulfur dioxide gas cylinder 1 is equipped with a heater 3a.

An exhaust pipe 20 is connected to an upper part of the reaction tank 10 and also to an alkali vessel 9 by way of a back pressure valve 8. The alkali vessel 9 typically contains aqueous solution of sodium hydroxide so as to absorb and collect excessive acid that comes out from the inside of the reaction tank 10 by way of the exhaust pipe 20. An atmosphere-exposed pipe 21 is connected to an upper part of the alkali vessel 9 to expose the inside of the alkali vessel to the atmosphere.

The reaction tank 10 is provided with water and iodine in advance by way of the supply tank 12 and the pipe 6. The sulfur dioxide in the sulfur dioxide gas cylinder 1 is heated to 30 to 50 degrees Celsius by the heater 3a and fed into the reaction tank 10. In this situation, the supply of sulfur dioxide is regulated and controlled by means of the pressurizing pump 11 and the back pressure valve 8, so that the internal gauge pressure of the reaction tank 10 is not less than 0.1 MPa according to reading of the pressure gauge 7. Subsequently, water and iodine are supplied to the reaction tank 10 by way of the supply tank 12 and the pipe 6.

Thus, with this embodiment, it is possible to dissolve sulfur dioxide into the aqueous solution in the reaction tank 10 as sulfur dioxide is supplied into the reaction tank 10 under pressure not lower than 0.1 MPa by operating the pressurizing pump 11 and/or the back pressure valve 8. The dissolved sulfur dioxide hydrates, and it can quantitatively react with iodine instantaneously to produce hydrogen iodide and sulfuric acid. The hydrogen iodide and the sulfuric acid that are produced in this way are separated into a lower phase and an upper phase, respectively. Thus, they can be taken out from the reaction tank 10 by way of the lower discharge pipe 14b and the upper discharge pipe 14a, respectively.

Thus, with this embodiment, sulfur dioxide is pressurized and is dissolved into a solvent, which is water. Thus, it is possible to avoid formation of sulfur as a result of reaction of sulfur dioxide and water, and to cause all the supplied sulfur dioxide to react with iodine. As sulfur dioxide is dissolved, it is possible to cause sulfur dioxide to instantaneously react at room temperature, and hence it is not necessary to keep the entire reaction tank 10 warm. Thus, it is possible to avoid deposition of sulfur, and, at the same time, to prevent loss of iodine and clogging of the pipes due to sublimation of iodine.

Third Embodiment

Figure 4:
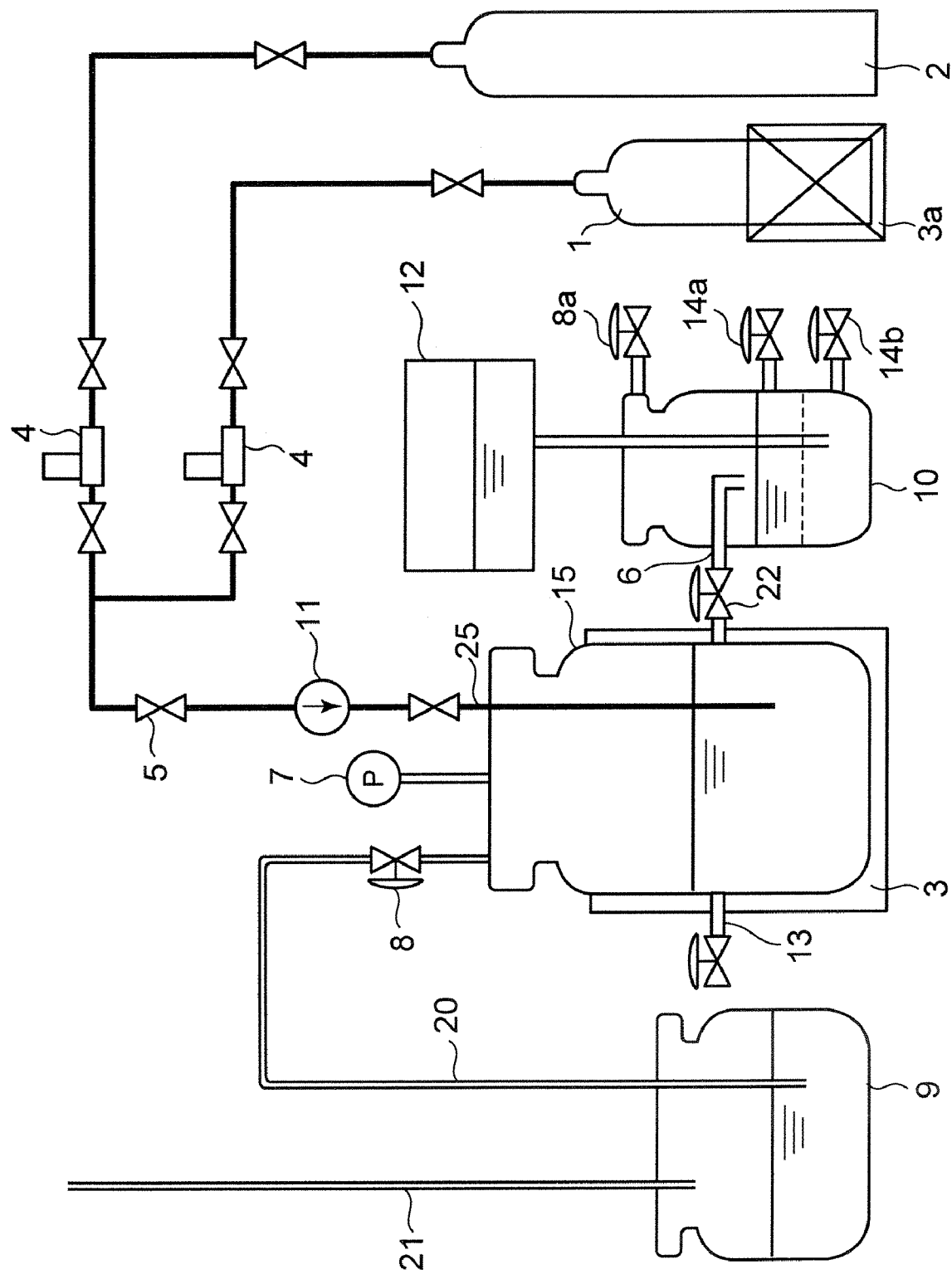
FIG. 4 is a schematic diagram of a hydrogen iodide manufacturing apparatus that can be used for the third and fifth embodiments of hydrogen iodide manufacturing method according to the present invention.

FIG. 4 is a schematic diagram of a hydrogen iodide manufacturing apparatus that can be used for the third embodiment of hydrogen iodide manufacturing method according to the present invention. In FIG. 4, the components same as or similar to those of the second embodiment are denoted respectively by the same reference symbols and will not be described repeatedly.

With this embodiment, a sulfur dioxide dissolving tank 15 is provided in addition to the reaction tank 10. Thus, it is so arranged that aqueous solution of sulfur dioxide that is formed in the sulfur dioxide dissolving tank 15 is transferred to the reaction tank 10 by way of the feed pipe 6 and a feed valve 22.

The sulfur dioxide dissolving tank 15 is a pressure-resistant container that is provided with a pressure gauge 7 for detecting the internal gauge pressure of the sulfur dioxide dissolving tank 15. A heater 3 is provided to heat the inside of the sulfur dioxide dissolving tank 15.

A sulfur dioxide gas cylinder 1 and a nitrogen gas cylinder 2 are arranged at the outside of the sulfur dioxide dissolving tank 15 and the reaction tank 10 to feed sulfur dioxide and nitrogen, respectively, to the sulfur dioxide dissolving tank 15 by way of respective mass flow meters 4, a valve 5, a pressurizing pump 11 and a sulfur dioxide feed pipe 25.

An exhaust pipe 20 is connected to an upper part of the sulfur dioxide dissolving tank 15 and also to an alkali vessel 9 by way of a back pressure valve 8. An atmosphere-exposed pipe 21 is connected to an upper part of the alkali vessel 9 to expose the inside of the alkali vessel 9 to the atmosphere.

The reaction tank 10 is equipped with an upper discharge pipe 14a and a lower discharge pipe 14b. A supply tank 12 is arranged above the reaction tank 10 to supply iodine and water into the reaction tank 10 by way of the pipe 6.

The sulfur dioxide in the sulfur dioxide gas cylinder 1 is heated to 30 to 50 degrees Celsius by the heater 3a and is fed into the sulfur dioxide dissolving tank 15. In this situation, the supply of sulfur dioxide is regulated and controlled by means of the pressurizing pump 11 and the back pressure valve 8, so that the internal gauge pressure of the sulfur dioxide dissolving tank 15 is not less than 0.1 MPa according to reading of the pressure gauge 7. The sulfur dioxide dissolving tank 15 is provided with water in advance. Alternatively, water may be supplied to the sulfur dioxide dissolving tank 15 from a supply pipe 13. The aqueous solution of sulfur dioxide that is formed in the sulfur dioxide dissolving tank 15 is held in a pressurized state and is moved into the reaction tank 10. The reaction tank 10 is provided with iodine or aqueous solution of iodine in advance. The inside of the reaction tank 10 is also regulated and controlled by means a back pressure valve 8a, so that the internal gauge pressure of the reaction tank 10 is kept not less than 0.1 MPa.

Thus, with this embodiment, sulfur dioxide is dissolved into the water in the sulfur dioxide dissolving tank 15 to produce a highly concentrated aqueous solution of sulfur dioxide by regulating the internal gauge pressure of the sulfur dioxide dissolving tank 15 to not lower than 0.1 MPa by means of the pressurizing pump 11 and/or the back pressure valve 8. Additionally, the aqueous solution of sulfur dioxide is transferred into the reaction tank 10, while maintaining the pressurized condition thereof, to cause it to react with iodine to produce hydrogen iodide and sulfuric acid.

Sulfur dioxide is dissolved in water, and hydrates with water molecules to be chemically changed into sulfurous acid molecules as shown in Formula (4-1). Sulfurous acid is reducing and reacts immediately with iodine quantitatively.

$$SO_2 + H_2O \rightarrow H_2SO_3 \quad (4\text{-}1)$$

$$SO_2 + nH_2O \rightarrow SO_2 \cdot nH_2O \quad (4\text{-}2)$$

Therefore, if sulfur dioxide is dissolved in water and is changed into sulfurous acid molecules or into hydrated sulfur dioxide molecules as shown in Formula (4-2) in advance, almost all the sulfur dioxide added to the reaction system can be reacted. With such a process, quantity of the formed hydrogen iodide is larger and the reaction efficiency is higher, compared with a process causing sulfur dioxide to react with iodine while passing sulfur dioxide through water.

In addition, when sulfur dioxide passes through water, excess sulfur dioxide reacts with water, and sulfur is formed as a result of a side reaction shown in the following formula:

$$3SO_2 + 2H_2O \rightarrow 2H_2SO_3 + S$$

Thus, as sulfur dioxide is dissolved into water under pressure in the sulfur dioxide dissolving tank 15, it is possible to produce highly concentrated aqueous solution of sulfurous acid, which is then caused to react with iodine in the reaction tank 10 to produce highly concentrated hydrogen iodide. While it is not possible to dissolve sulfur dioxide into water by more than 5% in terms of weight percentage concentration under the atmospheric pressure, it is possible to produce aqueous solution of sulfur dioxide with a concentration not lower than 80% by pressurizing sulfur dioxide and cause it to quantitatively react with iodine instantaneously. As the operation of dissolving sulfur dioxide into water and that of causing the aqueous solution of sulfur dioxide to react with iodine under a pressurized condition are conducted, it is possible to avoid a decomposition reaction of sulfur dioxide by water and hence no sulfur deposition takes place.

Fourth Embodiment

Figure 5:
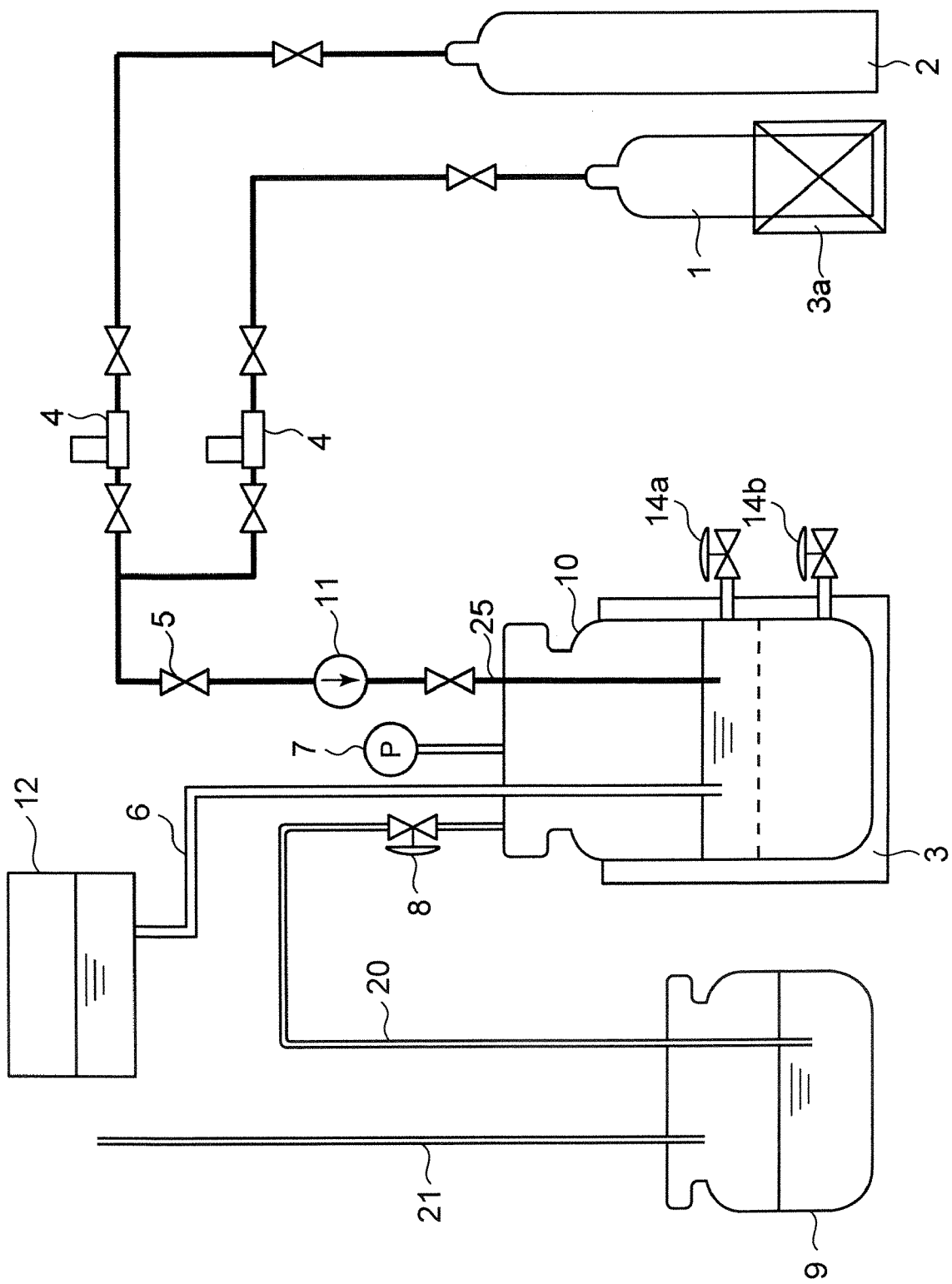
FIG. 5 is a schematic diagram of a hydrogen iodide manufacturing apparatus that can be used for the fourth embodiment of hydrogen iodide manufacturing method according to the present invention.

FIG. 5 is a schematic diagram of a hydrogen iodide manufacturing apparatus that can be used for the fourth embodiment of hydrogen iodide manufacturing method according to the present invention. In FIG. 5 the components same as or similar to those of first through third embodiments are denoted respectively by the same reference symbols and will not be described repeatedly.

While the hydrogen iodide manufacturing apparatus of FIG. 5 has a configuration similar to that of FIG. 3, it differs from the latter in that the lower end of the sulfur dioxide feed pipe 25 in the reaction tank 10 is located slightly below the liquid surface in the reaction tank 10 and hence considerably above the lower end of the sulfur dioxide feed pipe 25 of FIG. 3.

With this embodiment, sulfur dioxide is heated to 30 to 50 degrees Celsius by the heater 3a and is fed into the reaction tank 10. In this situation, the supply of sulfur dioxide is regulated and controlled by means of the pressurizing pump 11 and the back pressure valve 8, so that the internal gauge pressure of the reaction tank 10 is not less than 0.1 MPa according to reading of the pressure gauge 7. The reaction tank 10 is provided with water and iodine in advance. Alternatively, iodine and water may be supplied from the iodine and water supply tank 12 into the reaction tank 10 by way of the feed pipe 6.

Iodine is added to the aqueous solution that contains hydrogen iodide, formed as a result of the Bunsen reaction, not less than 0.5 times of the mass of the hydrogen iodide to produce two phases of an upper phase and a lower phase. It is preferable that iodine is added by a mass not less than 0.5 times of the mass of the hydrogen iodide, because excessive iodine constantly exists under such a condition. Sulfur dioxide is added to the two-phase liquid under a pressurized condition of not lower than 0.1 MPa and water and iodine are supplied from the feed pipe 6 to maintain the two-phase situation.

With this embodiment, iodine is added to the aqueous solution that contains hydrogen iodide as produced in the first embodiment or the second embodiment to produce a two-phase liquid, and then, sulfur dioxide is added under pressure. The added sulfur dioxide is dissolved mainly in the upper phase that contains water to a large extent and become hydrated to consequently react with the iodine mainly dissolved in the lower phase and located near the interface of the two-phase liquid to form hydrogen iodide and sulfuric acid.

As sulfur dioxide is added to the two-phase liquid, while maintaining a pressurized state, sulfur dioxide is hydrated in the upper phase, and the hydrogen iodide formed as a result of the reaction of sulfur dioxide and iodine along the interface of the two-phase liquid is drawn into the lower phase, while sulfuric acid remains in the upper phase. Thus, hydrogen iodide is drawn into the lower phase as it forms a complex with iodine when water and iodine are supplied to the two-phase liquid system to maintain the two-phase situation, and it becomes concentrated, as it is dehydrated. The Bunsen reaction and the two-phase separation can be realized simultaneously by adding sulfur dioxide, while pressuring it to a gauge pressure level of 0.1 MPa or higher. Then, the hydrogen iodide concentration in the lower phase can exceed 57% that is the concentration of the azeotropic composition thereof.

The Bunsen reaction was actually conducted in a pressurized condition when the reading of the pressure gauge 7 was 0.4 MPa, and then hydrogen iodide was condensed while maintaining the two-phase state situation to get to a concentration of 73 to 94% of hydrogen iodide in terms of weight percentage concentration that was in excess of the azeotropic composition thereof. If the aqueous solution of hydrogen iodide in the lower phase is left under the atmospheric pressure, the hydrogen iodide concentration decreases. However, it is possible to maintain the concentrated state by producing two phases under pressure and maintaining the pressurized condition.

Fifth Embodiment

Now, a fifth embodiment of hydrogen iodide manufacturing method according to the present invention will be described below. The hydrogen iodide manufacturing apparatus to be used for this embodiment has a configuration same as that of the third embodiment (FIG. 4).

With this embodiment, the sulfur dioxide in the sulfur dioxide gas cylinder 1 is heated by the heater 3a to 30 to 50 degrees Celsius and fed into the sulfur dioxide dissolving tank 15. In this situation, the supply of sulfur dioxide is regulated and controlled by means of the pressurizing pump 11 and the back pressure valve 8, so that the internal gauge pressure of the sulfur dioxide dissolving tank 15 is not less than 0.1 MPa according to reading of the pressure gauge 7. The sulfur dioxide dissolving tank 15 is provided with water in advance. Alternatively, water may be supplied to the sulfur dioxide dissolving tank 15 from a supply pipe 13.

The aqueous solution of sulfur dioxide produced in the sulfur dioxide dissolving tank 15 is then moved to the reaction tank 10 by way of the feed pipe 6 and the feed valve 22 while maintaining the aqueous solution of sulfur dioxide in the pressurized condition. The reaction tank 10 is provided with iodine or aqueous solution of iodine in advance. The inside of the reaction tank 10 is also regulated and controlled, so that the internal gauge pressure of the reaction tank 10 is not less than 0.1 MPa. The reaction tank 10 is provided with water and iodine in advance. Iodine is put into the reaction tank 10 by an amount not less than 0.5 times of the mass of water. When sulfur dioxide is added by an amount not less than 0.5 times of the mass of the iodine in the reaction tank 10, the reaction solution in the reaction tank 10 is divided into upper and lower phases. The addition of aqueous solution of sulfur dioxide to the produced two-phase liquid is continued from the sulfur dioxide dissolving tank 15 while it is pressurized to a gauge pressure level not lower than 0.1 MPa. At the same time, water and iodine are supplied from the supply tank 12 by way of the feed pipe 6 to maintain the two-phase situation.

Thus, with this embodiment, the hydrogen iodide and the sulfuric acid produced by adding sulfur dioxide to iodine-containing aqueous solution in a pressurized condition form two phase liquid because of iodine that is present excessively. As sulfur dioxide is added to the formed two-phase liquid in a pressurized condition, the added sulfur dioxide is dissolved mainly in the upper phase that contains water to a large extent so as to be hydrated, and to react with iodine mainly dissolved in the lower phase along the interface of the two-phase liquid to consequently produce hydrogen iodide and sulfuric acid.

Thus, with this embodiment, two-phase liquid is formed as the Bunsen reaction proceeds when iodine is added to the reaction tank 10 by an amount not less than 0.5 times of the mass of water. Then, as sulfur dioxide is added to the formed two-phase liquid while maintaining the pressurized condition, sulfur dioxide is hydrated in the upper phase. Then, the hydrogen iodide produced by a reaction of sulfur dioxide with iodine along the interface of the two-phase liquid is drawn into the lower phase. Meanwhile, sulfuric acid remains in the upper phase. As water and iodine are supplied to the two-phase liquid system so as to maintain the two-phase situation, hydrogen iodide forms complex with iodine and is drawn into the lower phase. Then, consequently, hydrogen iodide is dehydrated and the hydrogen iodide becomes concentrated. The Bunsen reaction and the two-phase separation can be realized simultaneously by adding sulfur dioxide, while pressurizing to a gauge pressure level of 0.1 MPa or higher. Then, the hydrogen iodide concentration in the lower phase can exceed 57% that is the concentration of the azeotropic composition thereof.

The embodiments of the hydrogen iodide manufacturing methods and hydrogen iodide manufacturing apparatus in accordance with the present invention explained above are merely examples, and the present invention is not restricted thereto. It is, therefore, to be understood that, within the scope of the appended claims, the present invention can be practiced in a manner other than as specifically described herein.

What is claimed is:

1. A hydrogen iodide manufacturing method comprising a step of producing an aqueous solution of hydrogen iodide and sulfuric acid by causing iodine-containing aqueous solution and sulfur dioxide to react with each other in a pressurized condition of not lower than 0.2 MPa in gauge pressure.

2. The method according to claim 1, further comprising: a separation step of adding iodine to the aqueous solution of hydrogen iodide and separating an upper phase containing sulfuric acid relatively to a large extent and a lower phase containing hydrogen iodide relatively to a large extent; and a step of producing hydrogen iodide by adding sulfur dioxide to the upper phase in a pressurized condition and extracting the produced hydrogen iodide to the lower phase.

3. The method according to claim 2, wherein iodine is added to the aqueous solution of hydrogen iodide by an amount not less than 0.5 times of the mass of the hydrogen iodide.

4. The method according to claim 2, wherein sulfur dioxide is pressurized to a gauge pressure level not lower than 0.1 MPa when sulfur dioxide is added to the upper phase.

5. The method according to claim 1, wherein the step of producing aqueous solution of hydrogen iodide and sulfuric acid includes a separation step of separating the upper phase containing sulfuric acid relatively to a large extend and a lower phase containing hydrogen iodide relatively to a large extent; the method further comprising: a step of producing hydrogen iodide by adding sulfur dioxide to the upper phase in a pressurized condition and extracting the produced hydrogen iodide to the lower phase.

6. The method according to claim 5, wherein sulfur dioxide is pressurized to a gauge pressure level not lower than 0.1 MPa when sulfur dioxide is added to the upper phase.

7. The method according to claim 1, further comprising: a step of distilling the aqueous solution of hydrogen iodide to obtain hydrogen iodide.

8. A hydrogen iodide manufacturing method comprising a step of producing sulfuric acid and an aqueous solution of hydrogen iodide by: forming a first aqueous solution containing sulfur dioxide or sulfurous acid by adding sulfur dioxide to water; and mixing a second aqueous solution containing iodine and the first aqueous solution, wherein the sulfur dioxide is pressurized to a gauge pressure level not lower than 0.2 MPa when the sulfur dioxide is added to water, and the first aqueous solution is pressurized to a gauge pressure level not lower than 0.2 MPa when the first aqueous solution and the second aqueous solution are mixed with each other.

9. The method according to claim 8, further comprising; a separation step of adding iodine to the aqueous solution of hydrogen iodide and separating an upper phase containing sulfuric acid relatively to a large extent and a lower phase containing hydrogen iodide relatively to a large extent; and a step of producing hydrogen iodide by adding sulfur dioxide to the upper phase in a pressurized condition and extracting the produced hydrogen iodide to the lower phase.

10. The method according to claim 9, wherein iodine is added to the aqueous solution of hydrogen iodide by an amount not less than 0.5 times of the mass of the hydrogen iodide.

11. The method according to claim 9, wherein sulfur dioxide is pressurized to a gauge pressure level not lower than 0.1 MPa when sulfur dioxide is added to the upper phase.

12. The method according to claim 1, wherein the step of producing aqueous solution of hydrogen iodide and sulfuric acid includes a separation step of separating the upper phase containing sulfuric acid relatively to a large extent and a lower phase containing hydrogen iodide relatively to a large extent; the method further comprising: a step of producing hydrogen iodide by adding sulfur dioxide to the upper phase in a pressurized condition and extracting the produced hydrogen iodide to the lower phase.

13. The method according to claim 12, wherein sulfur dioxide is pressurized to a gauge pressure level not lower than 0.1 MPa when sulfur dioxide is added to the upper phase.

14. The method according to claim 8, further comprising: a step of distilling the aqueous solution of hydrogen iodide to obtain hydrogen iodide.

15. A method of producing hydrogen from iodide and sulfur dioxide, the method comprising producing an aqueous solution of hydrogen iodide and sulfuric acid by causing iodine-containing aqueous solution and sulfur dioxide to react with each other in a pressurized condition of not lower than 0.2 MPa in gauge pressure;

separating the hydrogen iodide from the sulfuric acid, and thermally decomposing the hydrogen iodide to hydrogen.

16. The method according to claim 15, further comprising: a separation step of adding iodine to the aqueous solution of hydrogen iodide and separating an upper phase containing sulfuric acid relatively to a large extent and a lower phase containing hydrogen iodide relatively to a large extent; and a step of producing hydrogen iodide by adding sulfur dioxide to the upper phase in a pressurized condition and extracting the produced hydrogen iodide to the lower phase.

17. The method according to claim 16, wherein iodine is added to the aqueous solution of hydrogen iodide by an amount not less than 0.5 times of the mass of the hydrogen iodide.

18. The method according to claim 16, wherein sulfur dioxide is pressurized to a gauge pressure level not lower than 0.1 MPa when sulfur dioxide is added to the upper phase.

19. The method according to claim 15, wherein the step of producing aqueous solution of hydrogen iodide and sulfuric acid includes a separation step of separating the upper phase containing sulfuric acid relatively to a large extent and a lower phase containing hydrogen iodide relatively to a large extent; the method further comprising: a step of producing hydrogen iodide by adding sulfur dioxide to the upper phase in a pressurized condition and extracting the produced hydrogen iodide to the lower phase.

20. The method according to claim 19, wherein sulfur dioxide is pressurized to a gauge pressure level not lower than 0.1 MPa when sulfur dioxide is added to the upper phase.

21. The method according to claim 15, further comprising: a step of distilling the aqueous solution of hydrogen iodide to obtain hydrogen iodide.

\* \* \* \* \*